United States Patent
Machcha et al.

(10) Patent No.: US 7,215,507 B2
(45) Date of Patent: May 8, 2007

(54) FLOW MODIFICATION FOR REDUCING TRACK MISREGISTRATION IN HARD DISK DRIVES

(75) Inventors: Ashok Machcha, Natick, MA (US); Gary Walker, Sherborn, MA (US); James F. Martin, Westborough, MA (US)

(73) Assignee: Maxtor Corporation, Scotts Valley, CA (US)

( * ) Notice: Subject to any disclaimer, the term of this patent is extended or adjusted under 35 U.S.C. 154(b) by 49 days.

(21) Appl. No.: 11/110,099

(22) Filed: Apr. 19, 2005

(65) Prior Publication Data

US 2005/0248878 A1    Nov. 10, 2005

Related U.S. Application Data

(62) Division of application No. 09/727,839, filed on Nov. 30, 2000, now Pat. No. 6,882,501.

(51) Int. Cl.
*G11B 33/14* (2006.01)
(52) U.S. Cl. .................................. 360/97.03
(58) Field of Classification Search ............ 360/97.03, 360/97.02
See application file for complete search history.

(56) References Cited

U.S. PATENT DOCUMENTS

| | | | |
|---|---|---|---|
| 3,720,931 A | 3/1973 | Andersen ............. 340/174.1 E |
| 3,812,534 A | 5/1974 | Rousseau et al. ............. 360/98 |
| 3,846,835 A | 11/1974 | Horovitz et al. ............. 360/98 |
| 4,112,471 A | 9/1978 | Pollard et al. ................. 360/98 |
| 4,250,528 A | 2/1981 | Oda ............................. 360/98 |
| 4,315,288 A | 2/1982 | Bernett et al. ................. 360/98 |
| 4,532,623 A | 7/1985 | Coyle ........................ 369/271 |
| 4,583,213 A | 4/1986 | Bracken et al. ............. 369/261 |
| 4,703,470 A | 10/1987 | Castagna et al. ........... 369/215 |
| 4,821,130 A | 4/1989 | Bernett et al. ........... 360/78.04 |
| 4,879,618 A | 11/1989 | Iida et al. .................... 360/106 |
| 4,982,300 A | 1/1991 | Forbord ...................... 360/106 |
| 5,031,059 A | 7/1991 | Yamaguchi et al. ...... 360/97.03 |
| 5,036,416 A | 7/1991 | Mastache .................... 360/105 |
| 5,057,182 A | 10/1991 | Wuchinich ............... 156/580.1 |
| 5,134,530 A | 7/1992 | Hall ........................ 360/97.03 |
| 5,140,578 A | 8/1992 | Tohkairin .................. 369/75.2 |
| 5,251,085 A | 10/1993 | Morris et al. ................ 360/106 |
| 5,418,866 A | 5/1995 | Chu ................................ 385/7 |
| 5,526,203 A | 6/1996 | Mohajerani et al. ...... 360/97.02 |
| 5,541,791 A | 7/1996 | Yamasaki et al. ........... 360/105 |

(Continued)

FOREIGN PATENT DOCUMENTS

JP     10-241310     9/1998

*Primary Examiner*—Julie Anne Watko
(74) *Attorney, Agent, or Firm*—Tejpal S. Hansra

(57) ABSTRACT

Systems and apparatus are described for modifying fluid flow in a hard disk drive system to reduce cross-track motion. The systems and methods provide advantages because they include at least one flow modification element. In some embodiments, the flow modification system comprises a set of approximately parallel combs occupying a portion of the space present in between the disks in the hard disk drive system. The combs change the flow pattern of the fluid and act as a momentum channeling mechanism relative to the actuator assembly and suspension assemblies resulting in a considerable reduction in track misregistration error. Various embodiments of the invention include baffle-integrated combs, fixture-integrated combs, contoured enclosure surfaces, and enclosure attached combs.

30 Claims, 5 Drawing Sheets

U.S. PATENT DOCUMENTS

| | | | |
|---|---|---|---|
| 5,696,649 A | 12/1997 | Boutaghou | 360/97.03 |
| 5,761,184 A | 6/1998 | Dauber et al. | 369/247 |
| 5,854,725 A | 12/1998 | Lee | 360/106 |
| 5,898,545 A | 4/1999 | Schirle | 360/105 |
| 6,097,568 A | 8/2000 | Ekhoff | 360/97.02 |
| 6,356,407 B1 | 3/2002 | Slezak | 360/97.02 |
| 6,714,379 B1 * | 3/2004 | Thompson et al. | 360/97.02 |
| 6,882,501 B2 | 4/2005 | Machcha et al. | 360/97.03 |
| 6,922,308 B1 * | 7/2005 | Butler | 360/97.02 |
| 2002/0071202 A1 | 6/2002 | Myokan et al. | 360/97.02 |

* cited by examiner

SECTION A-A

SECTION A-A

FLOW MODIFICATION FOR REDUCING TRACK MISREGISTRATION IN HARD DISK DRIVES

CROSS-REFERENCE TO RELATED APPLICATION

This is a divisional of U.S. patent application Ser. No. 09/727,839 filed Nov. 30, 2000 now U.S. Pat. No. 6,882,501 entitled "FLOW MODIFICATION FOR REDUCING TRACK MISREGISTRATION IN HARD DISK DRIVES," which is incorporated by reference in its entirety.

BACKGROUND OF THE INVENTION

1. Field of the Invention

This invention relates generally to the field of hard disk drives. More particularly, the invention relates to hard disk drives having at least one flow modification element disposed adjacent to at least one data storage disk.

2. Discussion of the Related Art

Conventional hard disk drive 100, a portion of which is shown in FIG. 1, includes at least one rotating disk 110 on which data is stored in concentric tracks. Disk drive 100 includes read-write head 120 disposed on aerodynamically operable slider assembly 130 and back plate 140. Slider assembly 130 is disposed at the end of the actuator arm portion of actuator assembly 160. Disk 110 couples with spindle 170 to rotate in a counterclockwise direction (shown as "A" in FIG. 1), thereby causing airflow in direction A. The airflow impinges upon portions of actuator assembly 160 and slider assembly 130. Movement of actuator assembly 160 is accomplished using a conventional voice coil motor (not shown in FIG. 1).

Head 120 reads data from and writes data to approximately concentric data tracks 210, shown schematically in FIG. 2. While disk drive 100 is in operation, actuator assembly 160 experiences cross-track motion 220 as head 120 attempts to follow track 210.

Cross track motion 220 of head 120 can be measured as track misregistration (TMR). Larger levels of TMR limit the amount of data that can be written to and retrieved from disk drive 100. Cross track motion 220 results from several disturbances that couple into head 120. Some of the major disturbances include disk vibration, spindle bearing runout (repeatable and non-repeatable), slider assembly 130 vibration, actuator arm vibration, and drive enclosure vibration.

In order to accurately read and write data, a servo control system is employed to keep head 120 aligned with track 210. The servo control system has its own attenuation and amplification characteristics, and is typically ineffective above about 4 kHz. Head 120 vibration spectrums for conventional disk drives 100 exhibit substantial vibrational movement of head 120 in a high frequency region of around 5 to 25 kHz. The servo control system is ineffective in compensating for the vibration in the high frequency region.

A common approach to increase the storage capacity of a disk drive 100 is to increase the track 210 density (tracks per inch, or TPI). Due to the continuing push for greater track 210 densities, allowable cross track motion 220 is decreasing in absolute terms. However, drives are spinning at higher speeds. Higher speeds increase the amount of cross track motion 220 of head 120. The increase in TMR (i.e., cross track motion 220) in the high frequency region is more pronounced at higher disk rotation speeds. A drive is typically designed so that the total TMR cannot exceed a certain limit (e.g., approximately ten percent of the track 210 width). As a result of this limit, at higher rotational speeds, no remaining TMR budget is available at the higher rotational frequencies, and the vibrational energy within the TMR spectral bandwidth of 0–25 kHz frequency range needs to be minimized in order to provide error-free operation of disk drives 100.

Disk drives 100 are known to those skilled in the art. For example, a conventional disk drive 100, such as the disk drive described by U.S. Pat. No. 5,526,203, can include baffle 190 disposed adjacent to upstream from actuator assembly 160. Baffle 190 is placed adjacent to the outermost diameter of disks 110. According to the U.S. Pat. No. 5,526,203 patent, one motivation for using baffles 190 is to block contaminants generated by actuator assembly 160 from being deposited on disks 110. Baffles 190 have the unintended effect of blocking airflow that would otherwise impinge on portions of actuator assembly 160 disposed outside outer edges 240 of disks 110. Such airflow blocking can reduce TMR in some designs.

However, baffles 190 cannot effectively reduce the airflow contributions (or momentum transfer) that cause cross track motion 220. Baffles 190 do not modify the airflow interaction with portions of actuator assembly 160 disposed between disks 110. Therefore, what is required is a solution that reduces the momentum transfer caused by airflow impinging these portions of actuator assembly 160 adjacent to disk 110 data surfaces. The reduction of momentum transfer decreases cross track motion 220 of head 120. Heretofore, the requirement of reduced cross track motion 220 referred to above has not been fully met.

SUMMARY OF THE INVENTION

One goal of the invention is to reduce cross track motion 220 in a disk drive. Another goal of the invention is to provide a comb, or other device to reduce cross track motion 220 in a disk drive.

A first aspect of the invention is implemented in embodiments that are based on a baffle integrated comb disk drive. The disk drive includes a spindle, data storage disks, slider assemblies, an actuator assembly, a baffle, and combs. The spindle is adapted to rotate about a longitudinal axis. The disks are surrounded by fluid medium. The disks are mounted on the spindle to rotate therewith about the spindle longitudinal axis. Rotation of the disks in a first direction (indicated by "A" in FIG. 1) creates a flow of the fluid medium in the first direction. At least one of the disks has approximately concentric tracks disposed at different radial positions between the disk's outer edge and the disk's inner edge. Each slider assembly includes at least one transducer head capable of reading and writing information on one of the disks. The actuator assembly positions the slider assemblies over the tracks.

The baffle is disposed upstream of the actuator assembly. The baffle extends in the direction of the spindle longitudinal axis and has an inner surface disposed at least one millimeter outside of the outer edges of the disks.

The combs are mounted on the baffle. At least one of the combs is disposed adjacent to at least one of the disks to form a gap between the comb and a corresponding adjacent disk. The gap is disposed in the direction of the spindle longitudinal axis and is in a range from approximately 0.1-millimeter to approximately 20 millimeters. At least one of the combs extends radially inward from a comb outer edge to a comb inner edge. A portion of the comb outer edge is disposed at the inner surface of the baffle. At least one of the combs is disposed upstream of a corresponding actuator assembly. At least one of the combs extends in a disk circumferential direction from a leading edge to a trailing edge. The leading edge is disposed upstream of the trailing edge. At least one of the combs extends radially inward from the baffle plate more than approximately two percent of a distance between an inner edge and the outer edge of the corresponding adjacent disk.

A second aspect of the invention is implemented in embodiments that are based on a fixture integrated comb disk drive. These embodiments include a comb fixture coupled with combs. The comb fixture is disposed apart from the actuator assembly, and has an inner surface separated by a first distance from the outer edges of the disks. The first distance is greater than approximately one millimeter.

The combs extend inwardly from the comb fixture. At least one of the combs is disposed adjacent to a corresponding adjacent disk to provide a gap between the comb and the corresponding adjacent disk. The gap is disposed in the direction of the spindle longitudinal axis and is in a range from approximately 0.1 millimeters to approximately 20 millimeters. At least one comb extends circumferentially around the spindle longitudinal axis.

A third aspect of the invention is a disk drive with at least one contoured enclosure element. Embodiments according to this aspect can have one or more of the following enclosure elements. The first type of enclosure element according to this aspect comprises a first large portion and a depressed contoured portion with a depressed region. The second type of enclosure element according to this aspect of the invention includes a second large portion and a protruded contoured portion with a protruded region.

The first large portion has a surface proximal to an adjacent disk outer surface and is disposed longitudinally outside the actuator assembly to form a gap in approximately the longitudinal direction between the first large portion proximal surface and the adjacent disk outer surface of at least approximately 0.1 millimeter. The depressed contoured portion is disposed circumferentially adjacent to and upstream of the actuator assembly. The depressed region is disposed closer to the adjacent disk outer surface than the first large portion. The first large portion covers more than approximately three times the amount of the adjacent disk outer surface than the amount of the outer surface that is covered by the depressed region.

The second large portion has a surface proximal to the adjacent disk outer surface and forms a gap in approximately the longitudinal direction between the second large portion proximal surface and the adjacent disk outer surface of no more than approximately 20 millimeters. The protruded region is disposed longitudinally outside the actuator assembly. The protruded region has a width outside the outer edge of the adjacent disk greater than a width of a portion of the actuator assembly adjacent and longitudinally interior of the protruded region. The protruded region is disposed farther from the adjacent disk outer surface than the second large portion. The second large portion covers more than approximately three times the amount of the adjacent disk outer surface than the amount of the outer surface that is covered by the protruded region.

These, and other, goals and aspects of the invention will be better appreciated and understood when considered in conjunction with the following description and the accompanying drawings.

BRIEF DESCRIPTION OF THE DRAWINGS

A clear conception of the advantages and features constituting the invention, will become more readily apparent by referring to the exemplary, and therefore non-limiting, embodiments. The embodiments are illustrated in the drawings, wherein like reference characters (if they occur in more than one view) designate the same parts. It should be noted that the features illustrated in the drawings are not necessarily drawn to scale.

DESCRIPTION OF PREFERRED EMBODIMENTS

The invention and the various features and advantageous details thereof are explained more fully with reference to the non-limiting embodiments that are illustrated in the accompanying drawings and detailed in the following description of preferred embodiments. Descriptions of well-known components and processing techniques are omitted so as not to unnecessarily obscure the invention in detail.

The invention reduces cross-track motion 220 of read-write head 120 over the complete spectral bandwidth of interest for a disk drive by introducing components that alter fluid movement in the disk drive. The reduction of cross-track motion 220 is accomplished by reducing the total cross-track momentum of fluid molecules that interact with disk drive components. The fluid can be air or another fluid, such as helium. Considerable decreases in design effort for dynamic disk drive components can be realized by implementing the invention with passive components. These passive components can be introduced at low cost and allow greater disk drive design flexibility.

Figure 3A:
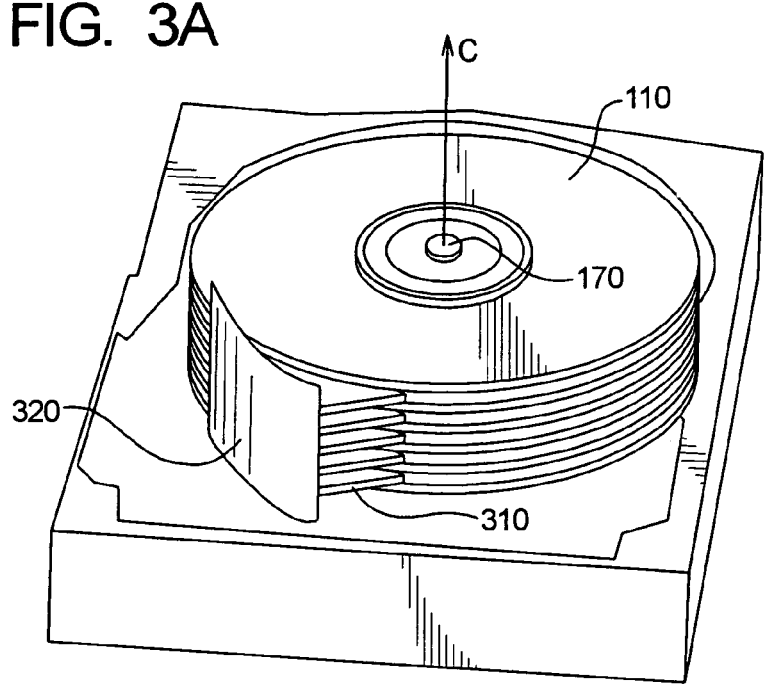
FIG. 3A is a perspective view of the front of portions of a disk drive having combs integrated into a baffle, representing a first embodiment of the invention.
Figure 3B:
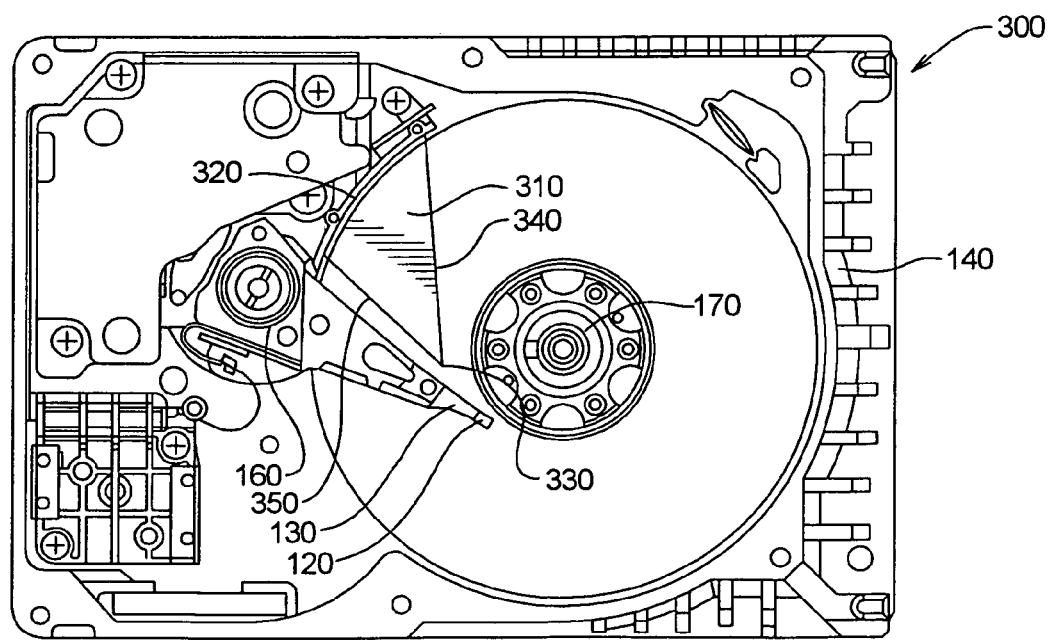
FIG. 3B is a top view of a portion of a baffle integrated comb disk drive, representing the first embodiment of the invention.

A portion of a baffle-integrated comb (BIC) disk drive 300 according to the principles of the invention is depicted in FIGS. 3A and 3B. Placing flow modifier combs, such as baffle integrated combs 310, in the space between disks 110 of BIC disk drive 300 reduces the fluid molecule momentum transfer to key portions of BIC disk drive 300. Baffle-integrated comb disk drives 300 typically have more than one disk 110. However, in some embodiments, two combs can be used according to the invention for a disk drive that has only one data disk.

Combs 310 provide a considerable reduction in cross-track motion 220 in all disturbance frequency regions, but particularly for the high frequency region (where the servo control system is not effective). Combs 310, and other flow modification elements according to the invention, are placed very close to corresponding adjacent rotating disks 10 to modify the flow characteristics of the fluid medium moved by disks 110.

The primary energy source for the fluid flow and other vibration disturbances of read-write head 120 is rotating spindle 170. The energy from spindle 170 is mainly partitioned off into the mechanical components of the corresponding disk drive (such as BIC disk drive 300), the fluid medium inside the drive enclosure, and as heat. Fluid medium receiving energy from spindle 170 serves as a secondary source of excitation for components inside BIC disk drive 300, so that the fluid medium flow affects the amount of cross-track motion 220. Cross-track motion 220 motion is a direct result of the momentum transfer that takes place as the high-energy fluid molecules impinge actuator assembly 160.

Figure 1:
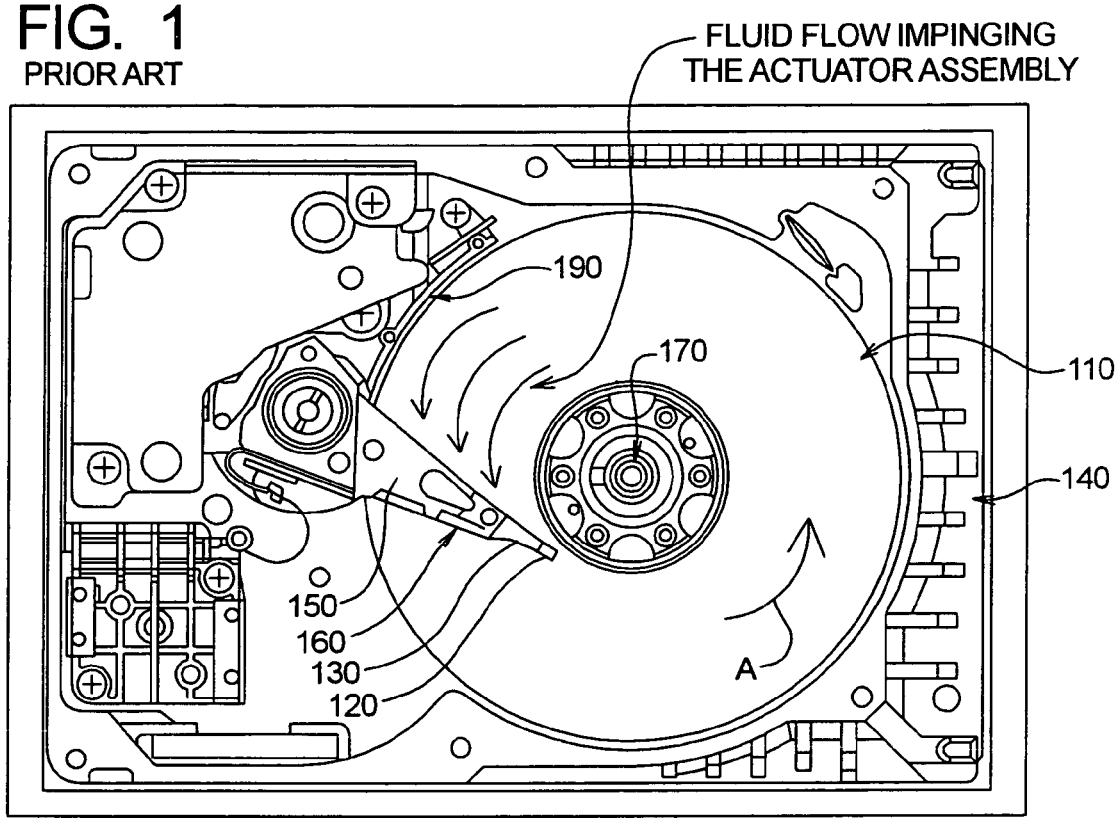
FIG. 1 is a top view of a portion of a conventional disk drive.
Figure 2:
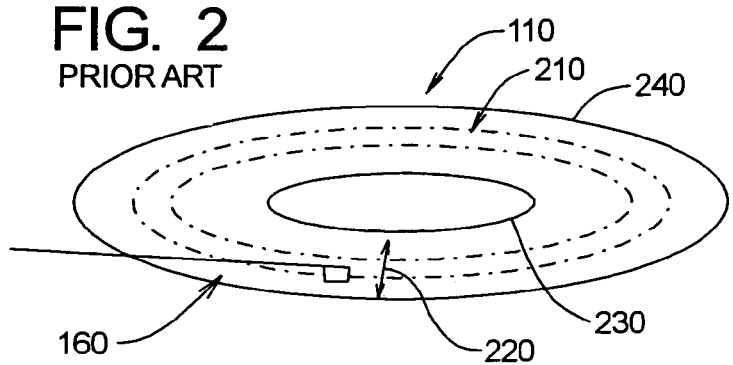
FIG. 2 is a schematic view of the top of a data storage disk and actuator arm.

Designing or locating the combs so that an energy dissipating flow region is developed also reduces this transfer of momentum. Because the comb acts as an obstruction to the normal flow of the rotating fluid, the fluid flow becomes very complex after interacting with the comb. The contact of the fluid with the comb results in flow separation, creation of vortices and mixing. These effects change the momentum vectors of the fluid molecules to a direction other than the nominal flow direction (shown as "A" in FIG. 1). This change in the fluid molecule momentum vectors translates into smaller momentum vectors of the fluid molecules in the cross-track motion 220 direction in the region of operation for actuator assembly 160. Further beneficial effects can be obtained through selection of materials and component geometry. Examination of FIG. 3B in conjunction with FIG. 1 and FIG. 2, reveals that fluid flow impingement on suspension arm 150, slider assembly 130 and read-write head 120 causes movement of these components in a direction that is not parallel to the track 210 direction. This non-parallel movement occurs because suspension arm 150 extends lengthwise in a direction other than the radial direction of disk 110. The angle between the radial direction and the suspension arm 150 lengthwise direction increases for tracks 210 disposed on the outer diameter of disk 110.

Introducing the comb increases power consumption due to cross-sectional and surface drag of the fluid medium. The higher power budget for the BIC drive 300 can be accommodated by careful selection of a comb unit design, or by considering other power saving mechanisms and designs, such as a lower number of disks 110, thinner disks 110 etc. These power reduction options are more readily available because of reduced cross-track motion 220 provided by the combs. Using fewer disks 110 also decreases the cost for read-write heads 120 in a disk drive.

Baffle Integrated Combs

Figure 4:
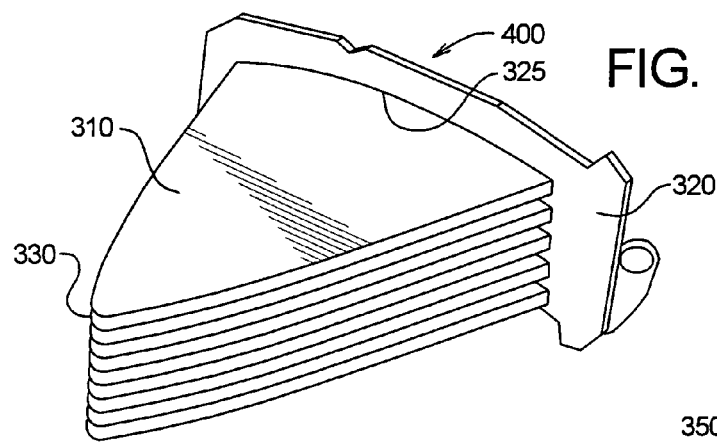
FIG. 4 is a perspective view of an integrated baffle/comb assembly having a baffle plate.
Figure 5:
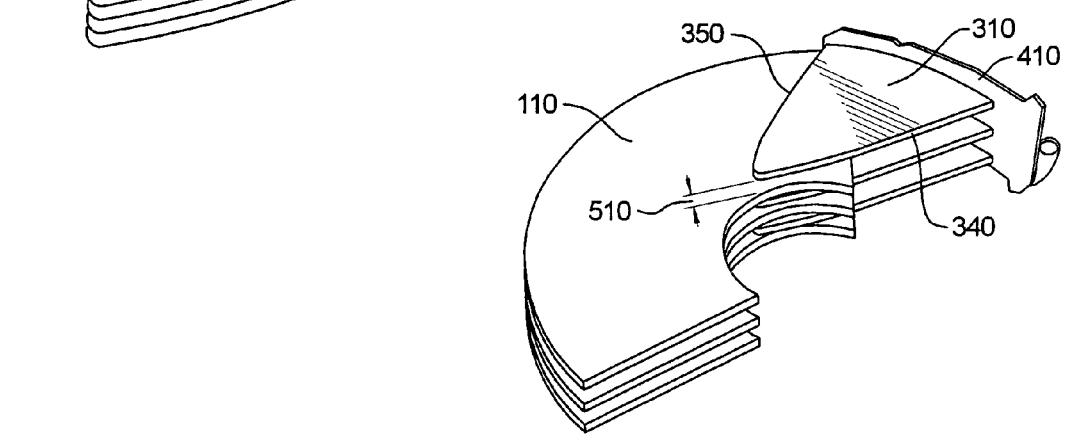
FIG. 5 is a perspective view illustrating how the baffle-integrated combs assemble into the space between the data storage disks.

One aspect of the invention provides a baffle integrated comb assembly for reducing cross track motion in a baffle integrated comb disk (BIC) drive. Portions of BIC drive 300 are shown in FIG. 3A and FIG. 3B. Some embodiments of baffle/comb assemblies 400 according to this aspect are illustrated in FIG. 4 and FIG. 5. BIC drive 300 comprises spindle 170, data storage disks 110, slider assemblies 130, actuator assembly 160, baffle integrated combs 310 and baffles 320.

Spindle 170 is conventionally coupled with a spindle motor to rotate about spindle longitudinal axis (shown as "C" in FIG. 3A) when BIC disk drive 300 is powered on. Each disk 110 is mounted on spindle 170 to rotate therewith about the spindle longitudinal axis in a first direction (e.g., either clockwise or counterclockwise around spindle longitudinal axis). Each disk 110 has an inner edge 230 and an outer edge 240. At least one of disks 110 has concentric tracks 210 disposed at different radial positions between inner edge 230 and outer edge 240. Rotating disks 110 create a flow of fluid medium contained in BIC drive 300 in the first direction.

BIC drive 300 shown in FIG. 3B includes conventional slider assemblies 130. Each slider assembly 130 includes at least one transducer head capable of reading and writing information on one of disks 110. BIC drive 300 also includes actuator assembly 160 for positioning slider assemblies 130 over concentric tracks 210.

BIC drive 300 includes a baffle/comb assembly 400 having integrated baffle 320 disposed upstream of actuator assembly 160. Baffle 320 extends in the direction of the spindle 170 longitudinal axis and has an inner surface disposed at least one millimeter outside of the outer edges 240 of disks 110.

As shown in FIG. 4A and FIG. 5, baffle integrated combs 310 are mounted on baffle 320. Each comb 310 is disposed adjacent to at least one disk 110 to form a comb-to-disk spacing 510 between comb 310 and a corresponding adjacent disk 110. Comb to disk spacing 510 is oriented approximately in the direction of the spindle 170 longitudinal axis and is in a range from approximately 0.1-millimeter to approximately 20 millimeters. In some embodiments, comb to disk spacing 510 is less than approximately 0.4 millimeters.

At least one comb 310 extends radially inward from a comb outer edge (otherwise referred to as a comb "base" 325) to a comb inner edge. B-comb base 325 is disposed approximately at the inner surface of baffle 320. The comb inner edge for triangular shaped combs comprises comb tip 330.

Each comb 310 is disposed upstream of a corresponding actuator assembly 160, and, as shown in FIG. 5, extends in a disk 110 circumferential direction from a leading edge 340 to a trailing edge 350. Leading edge 340 is disposed upstream of trailing edge 350.

As shown in FIG. 3B, each comb 310 extends radially inward from baffle 320 more than approximately two percent of a radial separation distance between disk inner edge 230 and disk outer edge 240 of a first adjacent disk 110.

Typically, comb's 310 maximum radially inward extent is approximately thirty to eighty percent (30–80%) of the disk inner edge 230 to disk outer edge 240 radial separation distance. As shown in FIG. 3B, comb 310 trailing edge is typically approximately parallel to the leading edge of actuator assembly 160 when actuator assembly 160 is positioned to read data track 210 near disk inner edge 230.

Combs 310 can be manufactured by molding the whole of baffle/comb assembly 400 at once. Baffle/comb assembly 400 can be machined as a single piece. For these single piece baffle/comb assembly 400 approaches baffle 320 comprises a baffle plate. Alternatively, combs 310 can produced as individual pieces and stacked one on top of the other. Each individual piece includes a baffle element 410 extending radially outward from comb base 325; Each baffle element 410 typically has a greater thickness than its corresponding comb 310 to provide space between adjacent B-combs for corresponding disks 110. The baffle/comb assembly 400 using individual comb 310 pieces does not need a baffle plate.

In some embodiments. BIC disk drive 300 includes a second set of combs extending radially inward from an outer attachment element inner surface. The second set of combs can be baffle integrated combs 310, or fixture integrated combs (as described below with reference to FIG. 7A). The outer attachment element inner surface has a diameter greater than the outer edge of disks 110, each of the second set of combs is disposed in a position adjacent, to at least one disk 110, and is disposed downstream of slider assemblies 130. The slider assemblies 130 are disposed on the distal end of actuator assembly 160.

In some embodiments, at least one of comb 310 comprises more than one element. At least two of the comb elements are separated from each other by an intra-comb gap. The intra-comb gap extends radially from approximately the comb 310 inner diameter to approximately the comb outer diameter.

In some embodiments, at least one comb 310 has a textured surface adapted to modify a fluid flow impinging on an adjacent slider assembly 130. For example, very-small v-shaped grooves disposed on either the distal or the proximal comb 310 surface (or on both surfaces) and oriented in a direction approximately perpendicular to the fluid flow results in decreased drag losses and concomitant power consumption reduction.

Figure 6A:
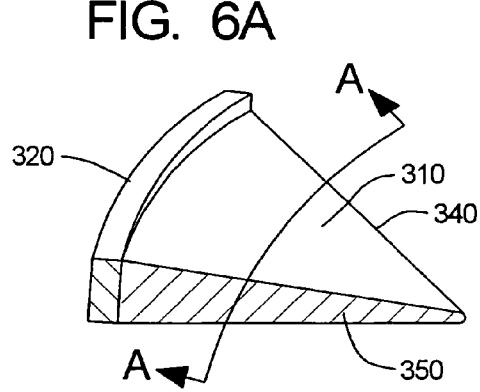
FIGS. 6A–6C provide different cross-sectional views of circumferentially tapered comb designs used in the present invention.
Figure 6B:
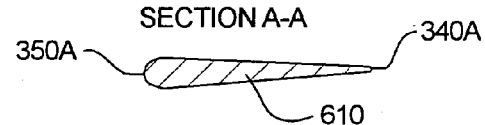
Figure 6C:
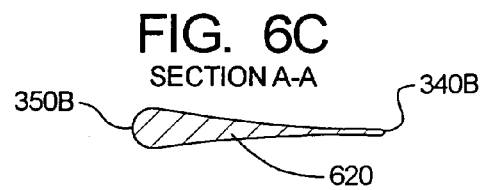

As shown in FIGS. 6A–6C comb 310 can be tapered so that the comb thickness increases form leading edge 440 to trailing edge 450. Comb 310 can have an approximately constantly sloped taper as shown in FIG. 6B, or alternatively can have a variably sloped taper as shown for example in FIG. 6C where the slope generally increases as the thickness of the B-comb increases.

As shown in FIG. 6A, at least one comb 310 can also have a thickness that increases from the comb inner diameter to the comb outer diameter.

Fixture Integrated Combs

Figure 7A:
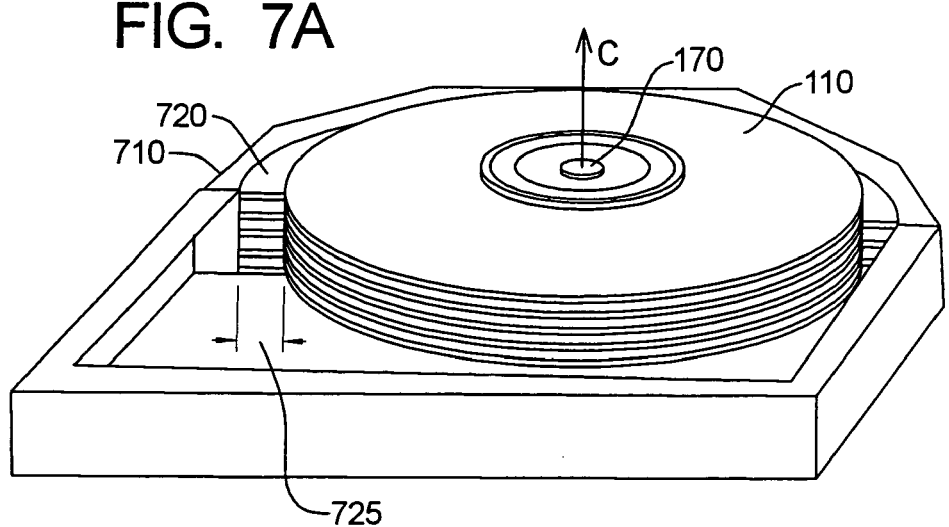
FIG. 7A is a perspective view of a portion of disk drive having fixture-integrated combs, representing a second embodiment of the invention.
Figure 7B:
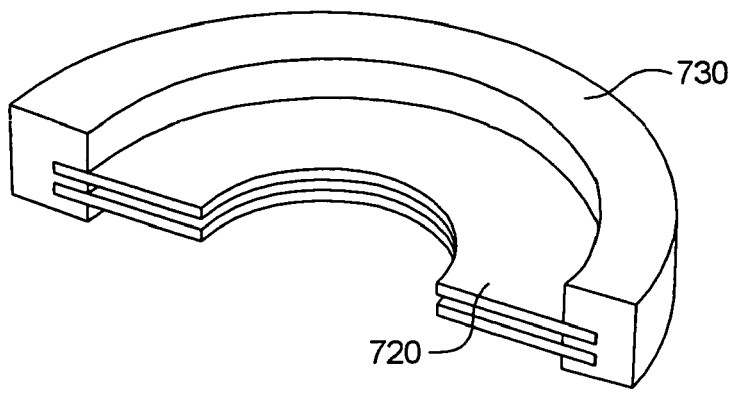
FIG. 7B is a perspective view of fixture integrated combs coupled with disk drive back plate having a fixture integrated therein.
Figure 7C:
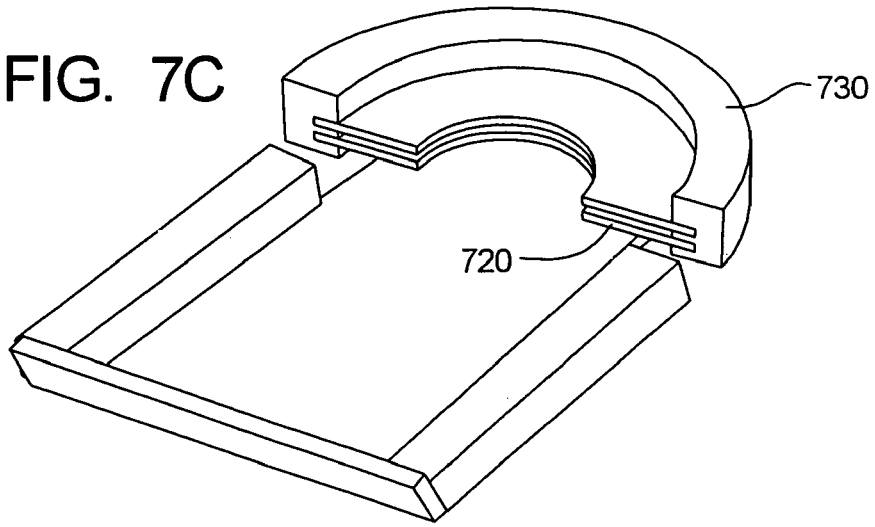
FIG. 7C is a perspective view of the fixture-integrated combs including some additional portions of the disk drive.

A portion of a fixture integrated comb (FIC) disk drive 700 is shown in FIGS. 7A–7C. The FIC disk drive 700 has a comb fixture 710 integrated with a back plate or other portion of a disk drive. FIC disk drive 700 includes the conventional elements described above for BIC disk drive 300. As shown in FIG. 7A, comb fixture 710 is disposed apart from actuator assembly 160, and has an inner surface separated in an approximately radial direction from the disk outer edge 240 by a fixture to disk spacing 725. Fixture to disk spacing 725 is greater than approximately one millimeter.

Fixture integrated combs 720 are coupled with and extend inwardly from comb fixture 710. Similar to baffle integrated combs 310, each fixture integrated comb 720 is disposed adjacent to a corresponding adjacent disk 110 to form a comb to disk spacing 510 between the comb and the adjacent disk. Comb to disk spacing 510 is disposed in the direction of the spindle longitudinal axis (shown as "C" in FIG. 7A) and is in a range from approximately 0.1 millimeters to approximately 20 millimeters. In some embodiments, comb to disk spacing 510 is less than approximately 0.4 millimeters.

Comb 720 extends inwardly at least two percent of a distance from comb fixture 710 to disk inner edge 230 of the corresponding adjacent disk. Comb 720 extends circumferentially around the spindle 170 longitudinal axis. Typically, comb 720 extends circumferentially through an angular distance of at least twenty degrees.

Various embodiments of FIC disk drive 700 have been developed. For some embodiments comb 720 includes a first portion and a second portion. The first portion has an outer diameter approximately equal to the comb fixture 710 inner surface. The second portion extends closer to the slider assemblies 130 and has an outer diameter less than the comb fixture 710 inner surface. Other combs 720, do not include such distinct portions.

In some embodiments. FIC disk drive 700 includes baffle 190 disposed outside disk 110 outer edges 240. Baffle 190 also has an edge spaced closely to a segment of disk outer edges 240. For these FIC disk drives 700 a first portion of the at least one comb 720 extends radially inward beyond the outer edge 240 of the corresponding adjacent disk 110. An edge of the first portion of comb 720 proximal to disk outer edge 240 extends circumferentially towards actuator assembly 160 forming a gap between the proximal edge of comb 720 and baffle 190 of no less than ten millimeters.

Contoured Enclosure Surfaces

Another aspect of the invention provides a disk drive with at least one enclosure element with a contoured surface. The contoured enclosure surface reduces cross-track motion 220. The contoured surface can be a portion of a cover plate or a portion of a base plate that provides the desired fluid flow modification in the disk drive. Portions of two embodiments of this aspect of the invention are shown in FIG. 8A and FIG. 8B.

Other than the contoured enclosure surface, disk drives according to this aspect typically have the conventional elements described above for BIC drive 300. As shown in FIG. 8A and FIG. 8B, disk 110 has outer edge 240, outer surface 805, inner edge 230, and an inner surface (not shown). The inner surface and outer surface 805 are approximately perpendicular to the spindle longitudinal axis (shown as "C" in FIG. 3).

Figure 8A:
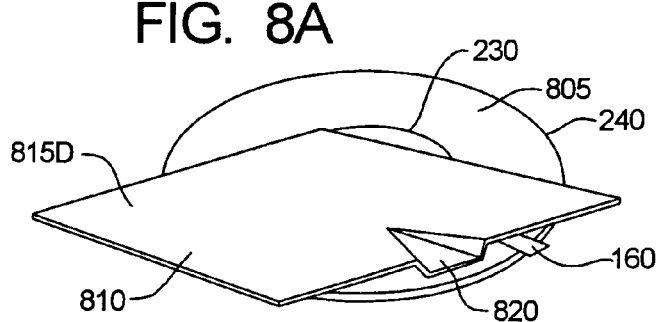
FIGS. 8A and 8B are perspective views of contoured cover plates, used in the present invention.

The enclosure element can include a large somewhat flat portion combined with a depressed contoured portion, such as a cover plate with a depressed contour (depressed contour cover plate 810) as shown in FIG. 8A. Depressed contour cover plate 810 includes large cover plate portion 815D and a depressed contoured portion having a depressed region 820. The proximal surface of depressed region 820 provides flow modification for outer surface 805 of the uppermost disk in a disk drive similar to the flow modification provided by baffle integrated comb 310 or fixture integrated comb 720. Large portion 815D has a surface (e.g., the bottom side of depressed contour cover plate 810) proximal to an adjacent disk outer surface 805. The proximal surface of large portion 815D is disposed longitudinally outside (e.g. above) actuator assembly 160 to form a gap in approximately the longitudinal direction between the proximal surface of large portion 815D and outer surface 805 of at least approximately 0.1 millimeter. The depressed contoured portion is disposed circumferentially adjacent to and upstream of actuator assembly 160. Depressed region 820 is disposed closer to outer surface 805 than large portion 815D. In some embodiments the distance between depressed region 820 and outer surface 805 is less than approximately 0.8 millimeters. Large portion 815D typically covers more than approximately three times the amount of outer surface 805 covered by depressed region 820.

Figure 8B:
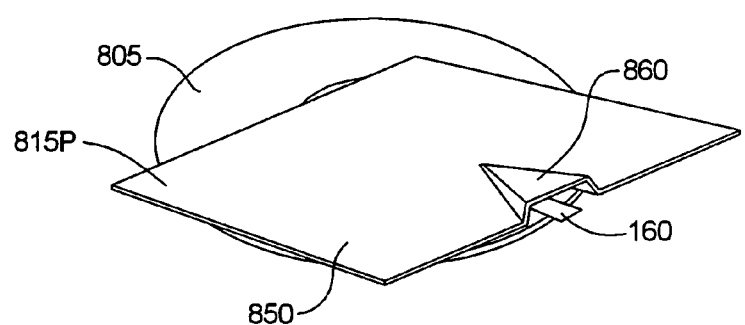
Figure 9A:
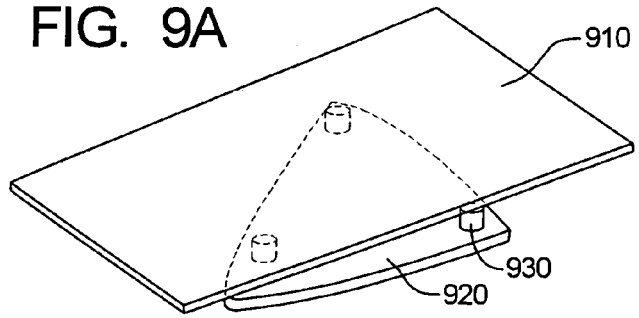
FIG. 9A is a perspective view of combs attached directly to a disk drive cover plate.
Figure 9B:
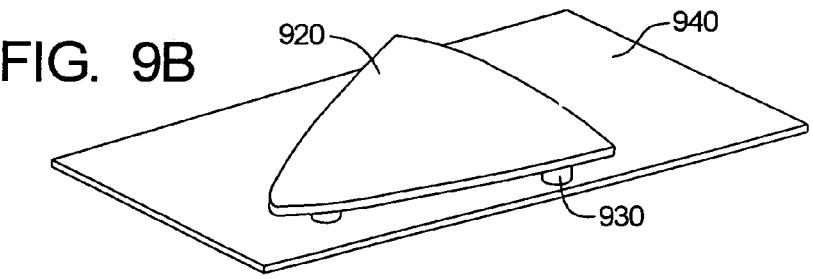
FIG. 9B is a perspective view of combs attached directly to a disk drive base plate.

For other embodiments according to this aspect the enclosure element can be a large somewhat flat portion combined with a protruded contoured portion such as a cover plate with a protruded contour (protruded contour cover plate 850) as shown in FIG. 8B. Protruded contour cover plate 850 includes large P-cover plate portion 815P and protruded contour portion having a protruded region 860. Large portion 815P has a surface proximal to outer surface 805 and forms a gap in approximately the longitudinal direction between the proximal surface and outer surface 805 of no more than approximately 20 millimeters. Protruded region 860 is disposed above actuator assembly 160. Protruded region 860 has a width above the of the adjacent disk outer edge 240 greater than a width of a portion of actuator assembly 160 adjacent and longitudinally interior of the protruded region 860. Protruded region 860 is disposed farther from outer surface 805 than large portion 815P. Large portion 815P typically covers more than approximately three times the amount of outer surface 805 covered by protruded region 860. The proximal surface of large portion 815P disposed upstream of actuator assembly 160 provides flow modification for outer surface 805 of the uppermost disk in a disk drive similar to the flow modification provided by baffle integrated comb 310 or fixture integrated comb 720. For some embodiments, the distance between the proximal surface of large portion 815P and outer surface 805 is less than approximately 0.8 millimeters.

Some other embodiments of the invention according to this aspect include base plates having elements with depressed regions or protruded regions as described above for the cover plates. The depressed region of base plate elements analogous to depressed contour cover plate 810, and the large P-cover portions of base plates elements analogous to protruded contour cover plate 850 provide flow modification for outer surface 805 of the lowermost disk in a disk drive. Finally, still other embodiments have both a contoured cover plate and a contoured base plate element as described above. These contoured enclosure elements can be used with baffle integrated combs 310 or fixture integrated combs 720 as described above.

Enclosure Attached Combs

Another aspect of the invention provides a enclosure attached comb disk drive assembly comprising a spindle 170, at least one data storage disk 110, conventional slider assemblies 130, an actuator assembly 160, an enclosure attached comb 910, an enclosure element, and attachment elements 930. Disk 110 has an outer radial edge, an outer surface, an inner radial edge, and an inner surface. Each slider assembly 130 includes at least one transducer head capable of reading and writing information on an adjacent disk 110. The enclosure element can be either a cover plate 910, or an element of a base plate including an attachment surface 940. The enclosure element has an interior surface proximal to attachment elements 930.

What is claimed is:

1. A disk drive assembly comprising:
   a cover plate;
   a base plate;
   a spindle that rotates about a longitudinal axis;
   a data storage disk having an outer radial disk edge, an inner radial disk edge and a disk surface, wherein the disk is mounted on the spindle and the disk surface is perpendicular to the longitudinal axis;
   a slider assembly that includes a transducer head that reads from and writes to the disk surface;
   an actuator assembly that positions the slider assembly over concentric tracks disposed at different radial positions on the disk surface; and
   an enclosure element having a large portion and a depressed contoured portion, wherein the enclosure element is provided by the cover plate or the base plate, the large portion covers more than three times the amount of the disk surface that is covered by the depressed contoured portion, and the depressed contoured portion is disposed upstream of the actuator assembly, is disposed closer than the large portion to the disk surface, and provides airflow modification of the airflow impinging on the actuator assembly thereby reducing cross-track motion of the transducer head and reducing track misregistration.

2. The disk drive assembly of claim 1, wherein the enclosure element is provided by the cover plate and the disk surface is the uppermost disk surface in the disk drive assembly.

3. The disk drive assembly of claim 1, wherein the enclosure element is provided by the base plate and the disk surface is the lowermost disk surface in the disk drive assembly.

4. The disk drive assembly of claim 1, wherein the depressed contoured portion has a generally triangular shape.

5. The disk drive assembly of claim 1, wherein the depressed contoured portion has a tip that is adjacent to the large portion and faces away from the outer radial disk edge.

6. The disk drive assembly of claim 1, wherein the depressed contoured portion tapers relative to the longitudinal axis such that a gap between the depressed contoured portion and the disk surface continuously increases as the depressed contoured portion extends from the outer radial disk edge towards the inner radial disk edge.

7. The disk drive assembly of claim 1, wherein the depressed contoured portion has a generally triangular shape, has a tip that is adjacent to the large portion and faces away from the outer radial disk edge, and tapers relative to the longitudinal axis such that a gap between the depressed contoured portion and the disk surface continuously increases as the depressed contoured portion extends from the outer radial disk edge towards the inner radial disk edge.

8. The disk drive assembly of claim 1, wherein the depressed contoured portion extends a circumferential angular distance that is less than 90 degrees.

9. The disk drive assembly of claim 1, wherein the depressed contoured portion is circumferentially adjacent to the actuator assembly such that no component of the disk drive assembly is circumferentially disposed between the depressed contoured portion and the actuator assembly.

10. The disk drive assembly of claim 1, wherein a distance between the large portion and the disk surface is less than 20 millimeters, and a distance between the depressed contoured portion and the disk surface is less than 0.8 millimeters.

11. A disk drive assembly comprising:
   a cover plate;
   a base plate;
   a spindle that rotates about a longitudinal axis;
   a data storage disk having an outer radial disk edge, an inner radial disk edge and a disk surface, wherein the disk is mounted on the spindle and the disk surface is perpendicular to the longitudinal axis;

a slider assembly that includes a transducer head that reads from and writes to the disk surface;

an actuator assembly that positions the slider assembly over concentric tracks disposed at different radial positions on the disk surface; and an enclosure element having a large portion and a protruded contoured portion, wherein the enclosure element is provided by the cover plate or the base plate, the large portion covers more than three times the amount of the disk surface that is covered by the protruded contoured portion and is disposed closer than the protruded contoured portion to the disk surface, and the protruded contoured portion extends upstream and downstream of and overlaps the actuator assembly, tapers relative to the longitudinal axis such that a gap between the protruded contoured portion and the disk surface decreases as the protruded contoured portion extends from the outer radial disk edge towards the inner radial disk edge, and provides airflow modification of the airflow impinging on the actuator assembly thereby reducing cross-track motion of the transducer head and reducing track misregistration.

12. The disk drive assembly of claim 11, wherein the enclosure element is provided by the cover plate and the disk surface is the uppermost disk surface in the disk drive assembly.

13. The disk drive assembly of claim 11, wherein the enclosure element is provided by the base plate and the disk surface is the lowermost disk surface in the disk drive assembly.

14. The disk drive assembly of claim 11, wherein the protruded contoured portion has a generally triangular shape.

15. The disk drive assembly of claim 11, wherein the protruded contoured portion has a tip that is adjacent to the large portion and faces away from the outer radial disk edge.

16. The disk drive assembly of claim 11, wherein the protruded contoured portion tapers relative to the longitudinal axis such that a gap between the protruded contoured portion and the disk surface continuously decreases as the protruded contoured portion extends from the outer radial disk edge towards the inner radial disk edge.

17. The disk drive assembly of claim 11, wherein the protruded contoured portion has a generally triangular shape, has a tip that is adjacent to the large portion and faces away from the outer radial disk edge, and tapers relative to the longitudinal axis such that a gap between the protruded contoured portion and the disk surface continuously decreases as the protruded contoured portion extends from the outer radial disk edge towards the inner radial disk edge.

18. The disk drive assembly of claim 11, wherein the protruded contoured portion extends a circumferential angular distance that is less than 90 degrees.

19. The disk drive assembly of claim 11, wherein the protruded contoured portion is circumferentially adjacent to the actuator assembly such that no component of the disk drive assembly is circumferentially disposed between the protruded contoured portion and the actuator assembly.

20. The disk drive assembly of claim 11, wherein a distance between the large portion and the disk surface is less than 0.8 millimeters, and a distance between the protruded contoured portion and the disk surface is less than 20 millimeters.

21. A disk drive assembly comprising:
a cover plate;
a base plate;
a spindle that rotates about a longitudinal axis;
a data storage disk having an outer radial disk edge, an inner radial disk edge and a disk surface, wherein the disk is mounted on the spindle and the disk surface is perpendicular to the longitudinal axis;
a slider assembly that includes a transducer head that reads from and writes to the disk surface;
an actuator assembly that positions the slider assembly over concentric tracks disposed at different radial positions on the disk surface;
an enclosure element; and
a comb mounted on the enclosure element by attachment elements, wherein the enclosure element is provided by the cover plate or the base plate and covers the comb and the attachment elements, the attachment elements are disposed between the enclosure element and the comb and are spaced from one another in a lateral plane parallel to the disk surface, and the comb covers the attachment elements, covers more than three times the amount of the disk surface that is covered by the attachment elements, is disposed closer than the enclosure element and the attachment elements to the disk surface, is disposed upstream of the actuator assembly, and provides airflow modification of the airflow impinging on the actuator assembly thereby reducing cross-track motion of the transducer head and reducing track misregistration.

22. The disk drive assembly of claim 21, wherein the enclosure element is provided by the cover plate and the disk surface is the uppermost disk surface in the disk drive assembly.

23. The disk drive assembly of claim 21, wherein the enclosure element is provided by the base plate and the disk surface is the lowermost disk surface in the disk drive assembly.

24. The disk drive assembly of claim 21, wherein the comb has a generally triangular shape.

25. The disk drive assembly of claim 21, wherein the attachment elements each have a generally cylindrical shape.

26. The disk drive assembly of claim 21, wherein the attachment elements are each disposed closer to a different corner of the comb than to one another.

27. The disk drive assembly of claim 21, wherein the comb has a generally triangular shape, and the attachment elements each have a generally cylindrical shape and are each disposed closer to a different corner of the comb than to one another.

28. The disk drive assembly of claim 21, wherein the comb extends a circumferential angular distance that is less than 90 degrees.

29. The disk drive assembly of claim 21, wherein the comb is circumferentially adjacent to the actuator assembly such that no component of the disk drive assembly is circumferentially disposed between the comb and the actuator assembly.

30. The disk drive assembly of claim 21, wherein a distance between the enclosure element and the disk surface is less than 20 millimeters, and a distance between the comb and the disk surface is less than 0.8 millimeters.

* * * * *